(12) United States Patent
Cooke et al.

(10) Patent No.: US 11,909,507 B2
(45) Date of Patent: *Feb. 20, 2024

(54) USING LOW EARTH ORBIT SATELLITES TO OVERCOME LATENCY

(71) Applicant: Parallel Wireless, Inc., Nashua, NH (US)

(72) Inventors: David Cooke, Melbourne (AU); Rajesh Kumar Mishra, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,305

(22) Filed: Mar. 25, 2022

(65) Prior Publication Data

US 2022/0216913 A1    Jul. 7, 2022

Related U.S. Application Data

(63) Continuation of application No. 16/847,618, filed on Apr. 13, 2020, now Pat. No. 11,290,178.

(Continued)

(51) Int. Cl.
| | |
|---|---|
| *H04B 7/185* | (2006.01) |
| *H04B 7/195* | (2006.01) |
| *H04B 7/19* | (2006.01) |
| *H04W 76/15* | (2018.01) |
| *H04W 28/02* | (2009.01) |

(Continued)

(52) U.S. Cl.
CPC ..... *H04B 7/18541* (2013.01); *H04B 7/18513* (2013.01); *H04B 7/19* (2013.01); *H04B 7/195* (2013.01); *H04W 24/08* (2013.01); *H04W 28/0268* (2013.01); *H04W 76/15* (2018.02); *H04W 88/10* (2013.01)

(58) Field of Classification Search
CPC .. H04B 7/18513; H04B 7/18541; H04B 7/19; H04B 7/195; H04W 24/08; H04W 28/0268; H04W 36/14; H04W 36/26; H04W 36/30; H04W 76/15; H04W 84/06; H04W 88/10; H04W 92/045
USPC .............. 455/3.02, 12.1, 11.1, 427; 370/316; 348/14.02
See application file for complete search history.

(56) References Cited

U.S. PATENT DOCUMENTS 5,887,257 A * 3/1999 Olds ...................... H04B 7/195
455/12.1
7,136,620 B2 * 11/2006 Wang ................. H04B 7/18513
455/430

(Continued)

*Primary Examiner* — Tan H Trinh
(74) *Attorney, Agent, or Firm* — Michael Y. Saji

(57) ABSTRACT

A method and system for using low earth orbit satellites to overcome latency is presented. In one embodiment, the method may include establishing a data session using a first channel having a first characteristic different than a second characteristic of a second channel, wherein the first channel is a Low Earth Orit (LEO) channel and wherein the second channel is a Geosynchronous Equatorial Orbit (GEO) channel; determining a type of traffic involved in the data session; determining whether the second channel should be used for the data session; when the second channel should be used for the data session, then switching the data session from the first channel to the second channel; and periodically monitoring the data session to determine whether the second channel should continue to be used for the data session.

18 Claims, 6 Drawing Sheets

Related U.S. Application Data

(60) Provisional application No. 62/833,266, filed on Apr. 12, 2019.

(51) Int. Cl.
*H04W 24/08* (2009.01)
*H04W 88/10* (2009.01)

(56) References Cited

U.S. PATENT DOCUMENTS

| | | | |
|---|---|---|---|
| 10,135,520 B2* | 11/2018 | Lemme | H04B 7/19 |
| 10,291,315 B1* | 5/2019 | Tong | H04W 16/28 |
| 10,476,585 B1* | 11/2019 | Torres | H04B 7/18513 |
| 10,637,562 B1* | 4/2020 | Cleave | H04B 7/18523 |
| 11,290,178 B2* | 3/2022 | Cooke | H04W 28/0268 |
| 2016/0006500 A1* | 1/2016 | Radpour | H04B 7/18539 |
| | | | 455/427 |
| 2017/0294957 A1* | 10/2017 | Ravishankar | H04W 40/12 |
| 2017/0366251 A1* | 12/2017 | Ravishankar | H04B 7/18513 |
| 2018/0376393 A1* | 12/2018 | Wu | H04L 5/26 |
| 2020/0322844 A1* | 10/2020 | Tatum | H04W 16/28 |

\* cited by examiner

USING LOW EARTH ORBIT SATELLITES TO OVERCOME LATENCY

RELATED APPLICATIONS

This application is a continuation of U.S. application Ser. No. 16/847,618, filed Apr. 13, 2020, which claims priority under 35 U.S.C. § 119(e) to U.S. Provisional Pat. App. No. 62/833,266, filed Apr. 12, 2019, titled "Using Low Earth Orbit Satellites To Overcome Latency", each of which is hereby incorporated by reference in its entirety for all purposes. This application hereby incorporates by reference, for all purposes, each of the following publications in their entirety for all purposes: U.S. Pat. App. Pub. Nos. US20140133456A1, US20150094114A1, US20150098385A1, US20150098387A1, US20150257051A1, US20160044531A1, US20170013513A1, US20170019375A1, US20170026845A1, US20170048710A1, US20170055186A1, US20170064621A1, US20170070436A1, US20170077979A1, US20170111482A1, US20170127409A1, US20170171828A1, US20170181119A1, US20170202006A1, US20170208560A1, US20170238278A1, US20170257133A1, US20170272330A1, US20170273134A1, US20170288813A1, US20170295510A1, US20170303163A1, US20170347307A1, US20180123950A1, and US20180152865A1; and U.S. Pat. Nos. 8,867,418, 8,879,416, 9,107,092, 9,113,352, 9,232,547, and 9,455,959.

BACKGROUND

A Low Earth Orbit (LEO) is technically an Earth-centered orbit with an altitude of 2,000 km (1,200 mi) or less (approximately one third of the radius of Earth), or with at least 11.25 periods per day (an orbital period of 128 minutes or less) and an eccentricity less than 0.25. The International Space Station conducts operations in LEO. All crewed space stations to date, as well as the majority of satellites, have been in LEO. In 2017, a very-low LEO orbit began to be seen in regulatory filings. This orbit, referred to as "VLEO", requires the use of novel technologies for orbit raising because they operate in orbits that would ordinarily decay too soon to be economically useful. However, satellites in LEO have a small momentary field of view, only able to observe and communicate with a fraction of the Earth at a time, meaning a network (or "constellation") of satellites is required to in order to provide continuous coverage.

Satellites in lower regions of LEO also suffer from fast orbital decay, requiring either periodic reboosting to maintain a stable orbit, or launching replacement satellites when old ones re-enter. Instead, the majority of satellites used for communication utilize a geostationary orbit, often referred to as a geosynchronous equatorial orbit (GEO), is a circular geosynchronous orbit 35,786 km (22,236 mi) above Earth's equator and following the direction of Earth's rotation. An object in such an orbit appears motionless, at a fixed position in the sky, to ground observers. Communications satellites and weather satellites are often placed in geostationary orbits, so that the satellite antennae (located on Earth) that communicate with them do not have to rotate to track them, but can be pointed permanently at the position in the sky where the satellites are located. The downside of GEO is that it is significantly more expensive to raise a satellite to GEO as compared to LEO.

SUMMARY

The inventors have contemplated various methods and systems, including using low earth orbit (LEO) satellites, to overcome communications link latency issues.

In a first embodiment, a method is disclosed, comprising: establishing a data session using a first channel having a first characteristic different than a second characteristic of a second channel, wherein the first channel may be a Low Earth Orit (LEO) channel and The second channel may be a Geosynchronous Equatorial Orbit (GEO) channel; determining a type of traffic involved in the data session; determining, based on the first characteristic of the first channel and the second characteristic of the second channel and the type of traffic involved, whether the second channel should be used for the data session; when the second channel should be used for the data session, then switching the data session from the first channel to the second channel; and periodically monitoring the data session to determine whether the second channel should continue to be used for the data session.

The establishing a data session using a first channel may comprise establishing a data session using an Internet of Things (IoT) channel or a cellular channel. Using a second channel may comprise using an IoT channel or a cellular channel. The first characteristic may be latency of the first channel and the second characteristic may be latency of the second channel. The first characteristic may be cost associated with the first channel and the second characteristic may be cost associated with the second channel. The first characteristic may be an availability of the first channel. The first characteristic or the second characteristic may be at least one Quality of Service (QOS) performance metric associated with the data session. Using the first channel may comprise using the LEO, and the method may further comprise communicating with the LEO using a Very Small Aperture Terminal (VSAT). The data session may comprise a first part and a second part, and using the first channel for the first part of the data session and using the second channel for the second part of the data session. Using the first channel may comprise using signaling data for the first part of the data session and wherein using the second channel may comprise using data traffic for the second part of the data session.

In a second embodiment, a system is disclosed, comprising: a terrestrial base station; a first channel having a first characteristic, the first channel in communication with the terrestrial base station, The first channel may be a Low Earth Orit (LEO) channel and wherein a f a data session may be established using the first channel; a second channel having a second characteristic, the second channel in communication with the terrestrial base station. The second channel may be a Geosynchronous Equatorial Orbit (GEO) channel and The second characteristic may be different from the first characteristic; wherein a determination may be made, based on the first characteristic of the first channel and the second characteristic of the second channel and the type of traffic involved in the data session, whether the second channel should be used for the data session; and when the second channel should be used for the data session, then the data session may be switched from the first channel to the second channel and The data session may be periodically monitored to determine whether the second channel should continue to be used for the data session.

The first channel may be an Internet of Things (IoT) channel or a cellular channel. The second channel may be an IoT channel or a cellular channel. The first characteristic may be latency of the first channel and the second characteristic may be latency of the second channel. The first characteristic may be cost associated with the first channel and the second characteristic may be cost associated with the second channel. The first characteristic may be an availability of the first channel. The first characteristic may be at least one Quality of Service (QOS) performance metric associated with the data session. Using the first channel may comprise using the LEO, and The method may further comprise communicating with the LEO using a Very Small Aperture Terminal (VSAT). The data session may comprise a first part and a second part, and using the first channel for the first part of the data session and using the second channel for the second part of the data session. Using the first channel may comprise using signaling data for the first part of the data session and wherein using the second channel may comprise using data traffic for the second part of the data session.

DETAILED DESCRIPTION

Figure 1:
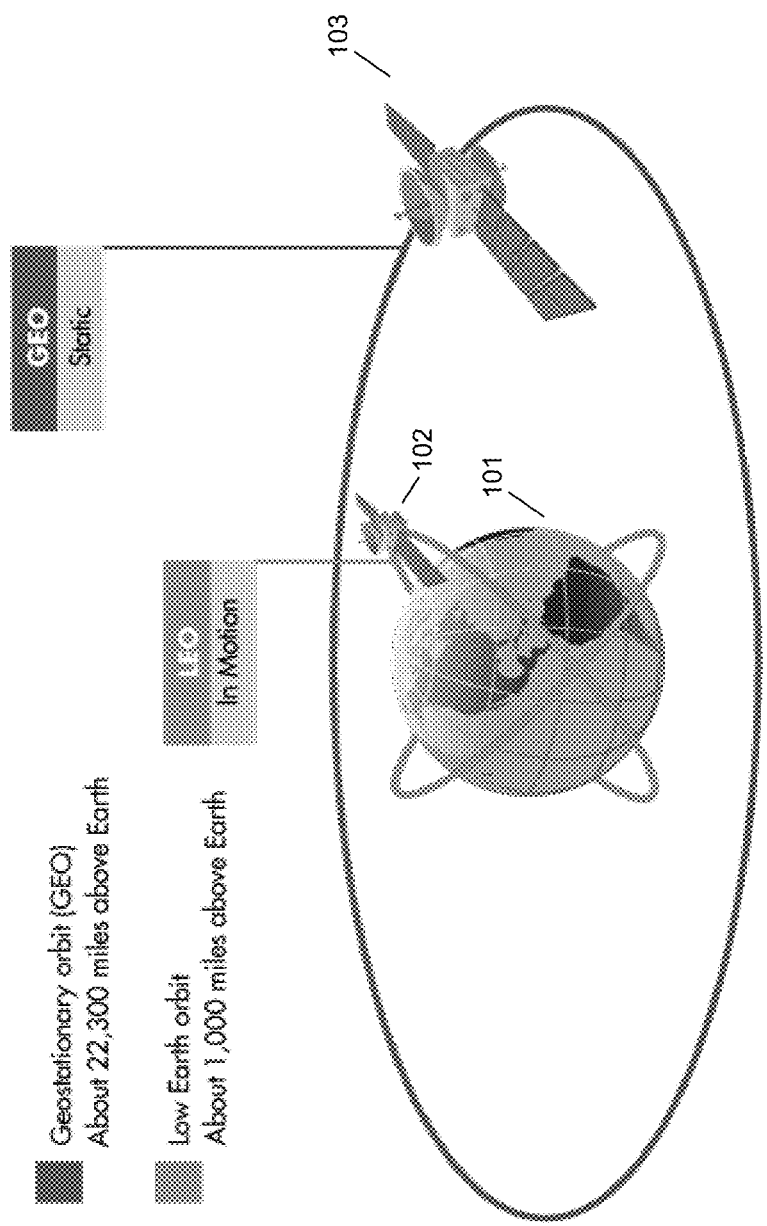
FIG. 1 depicts a satellite orbital configuration with LEO and GEO.

Geostationary satellites are commonly used for telecommunications. However, in consideration of the round trip latency challenges geostationary satellite operators face, the inventors have recognized that it is possible to leverage the network awareness of a network coordinator such as the Parallel Wireless HNG to transfer traffic from one channel with certain characteristics to another with different characteristics.

In some embodiments, LEO satellites with their low latency can be used as initial session establishment before the network coordinator learns the characteristics of the type of traffic involved in the session. For nominated types such as video downloads and file transfers where the end user does not care about latency once the stream is open, the network coordinator can pass transmission of the stream from the (expensive) LEO to the (cheaper) GEO on a session by session basis and monitor the traffic to ensure that its characteristics remain the same (to ensure, for example, that someone doesn't switch from watching streaming to interactive services where latency is important).

The disclosed methods and systems are applicable to all communications channels where an alternative high capacity but higher latency channel exists for traffic for which is latency irrelevant. This is only possible where a system is aware of the traffic flows and can select the appropriate route—identified here as the network coordinator function.

A low bandwidth low latency channel (e.g., first responder mesh or LTE backhaul, LEO, 2G, etc.) can be used for initial traffic channel establishment, in some embodiments, then a network concentrator/coordination node such as the PW HNG may assess the nature of the session and pass off to a higher bandwidth higher latency medium if it is able to be tolerated by the use case. This presupposes that there are multiple backhauls available. The direction of streaming is irrelevant, i.e., up or downstream use cases apply equally.

In some embodiments, a cell site would be connected to both LEO and GEO backhaul (consider a remote disaster in a public safety setting with no terrestrial backhaul at all), and according to the present disclosure, initial communications/coordination/browsing is done using LEO with low latency but higher cost, and only latency-tolerating applications such as video streaming or data feeds switch to lower cost channels.

In some embodiments, only enough visibility of the traffic latency requirements is required to allow HNG to decide a route for a given session/stream and review the decision over time in case usage changes. The inventors have contemplated scenarios in which payload traffic does not have to all pass via the HNG or coordinating node for efficiency. However, even if all traffic—payload or signaling—from the base station goes through the HNG, the high latency tolerant traffic is routed away from the higher cost, more easily congested, lower latency channel. In some embodiments, satellite backhaul could be used directly from the base station, not going through the HNG, with the CWS communicating via another signaling pathway to the HNG, using the LEO route, and for the HNG to determine whether to send data plane traffic via LEO or GEO based on data from the CWS and the separate signaling pathway. The separate signaling pathway could be another cellular network, SMS, microwave, NLOS networking of another type, a physical telecom line, or any other network.

FIG. 1 depicts a satellite orbital configuration with LEO and GEO. Satellites 102 and 103 orbit the Earth 101. LEO satellite 102 is located at a much lower altitude, about 1,000 miles above the Earth, and additionally is in rapid motion from the viewpoint of an observer on earth. For example, the International Space Station (ISS), which is in LEO, typically orbits the Earth every 90 minutes and is visible for anywhere between 5 minutes and a few seconds, for up to 4 or 5 times per day, for a typical observer. By contrast, satellite 103 is only visible from certain areas on the Earth, but to the typical observer does not move in the sky, since the satellite is moving at the same rate as the rotation of the earth. However, satellite 103 is much further away (22,300 miles) from the observer, which introduces approximately 120 ms of latency for every communication.

Figure 2:
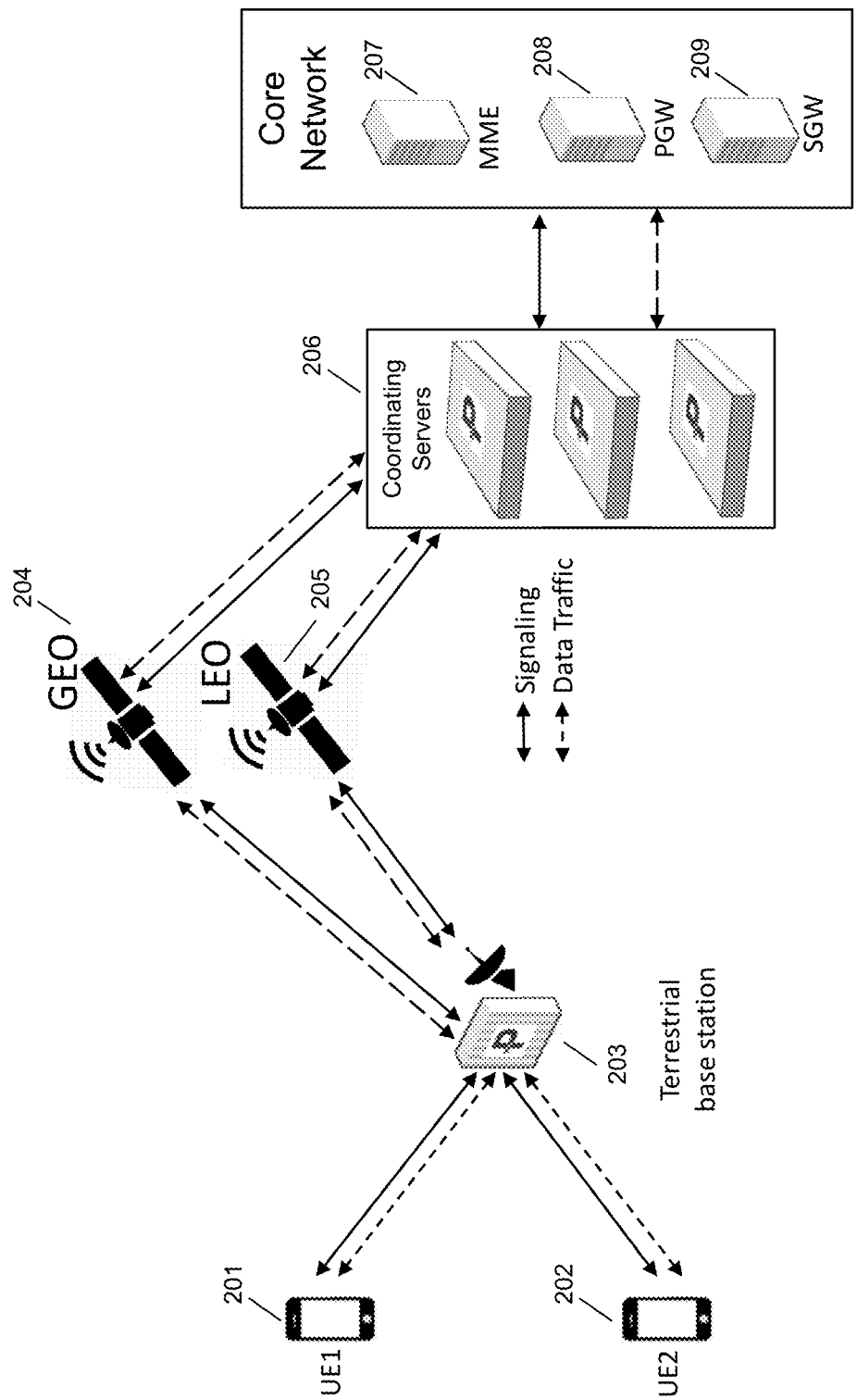
FIG. 2 depicts a network architecture, in accordance with some embodiments.

FIG. 2 depicts a network architecture, in accordance with some embodiments. User equipments UE 1 201 and UE 2 202 are connected to terrestrial base station 203, which has a satellite ground station, such as a very small aperture terminal (VSAT), for communication with LEO satellite 205 and GEO satellite 204 with both signaling and data traffic. The LEO and GEO satellites are connected to one or more coordinating servers 206. The coordinating servers serve to coordinate base station 203 while also providing gateway and/or virtualization functionality toward core network 207, 208, 209. The core network shown is an LTE core network that includes mobility management entity 207, packet data network gateway 208, and serving gateway 209.

In some embodiments, the coordinating servers may be redundant or may perform load balancing or may otherwise provide increased redundancy and availability, as is known in the art. In some embodiments one VSAT may be used for communicating with both LEO and GEO satellites 205 and 204, respectively. In some embodiments, multiple VSATs may be used to separately provide dedicated communications with LEO and GEO satellites, without the burden of reacquiring the satellite signal and enabling both connections to be maintained at the same time. Any core network, multiple core networks, the public Internet, etc. may be used instead of the LTE core network shown.

In some embodiments, the base station 203 is responsible for establishing an initial connection with the coordinating nodes 206, which then results in data flowing back and forth between the UEs and the core network via the coordinating nodes and via the satellite backhauls. However, in some embodiments, the base station may discriminate between the LEO satellite and the GEO satellite for purposes of establishing the connection. For example, the LEO satellite has lower latency and can be used to establish the connection. Subsequent communications may utilize both the LEO and the GEO satellite.

Figure 3:
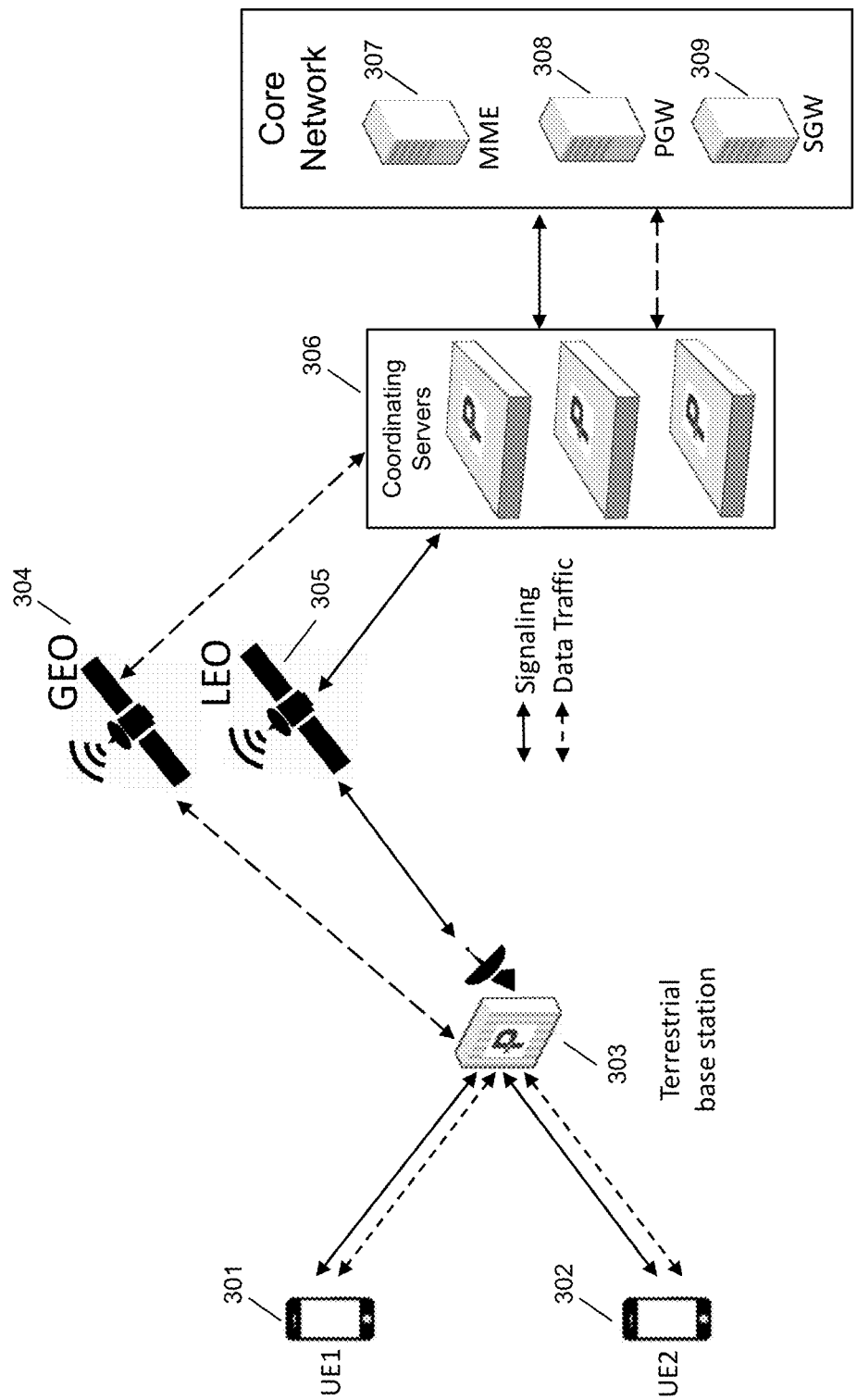
FIG. 3 depicts a further network architecture, in accordance with some embodiments.

FIG. 3 depicts a further network architecture, in accordance with some embodiments. UEs 301 and 302 are shown, connecting to terrestrial base station 303, which is in communication, via GEO satellite 304 and LEO satellite 305, to coordinating servers 306 and core network nodes 307, 308, 309. In the depicted use case, signaling is handled by LEO satellite 305, which reduces latency for establishment of any signaling, and data traffic is handled by GEO satellite 304. This discrimination may be performed by coordinating servers 306, which communicates the distinction to the base station 303.

Figure 4:
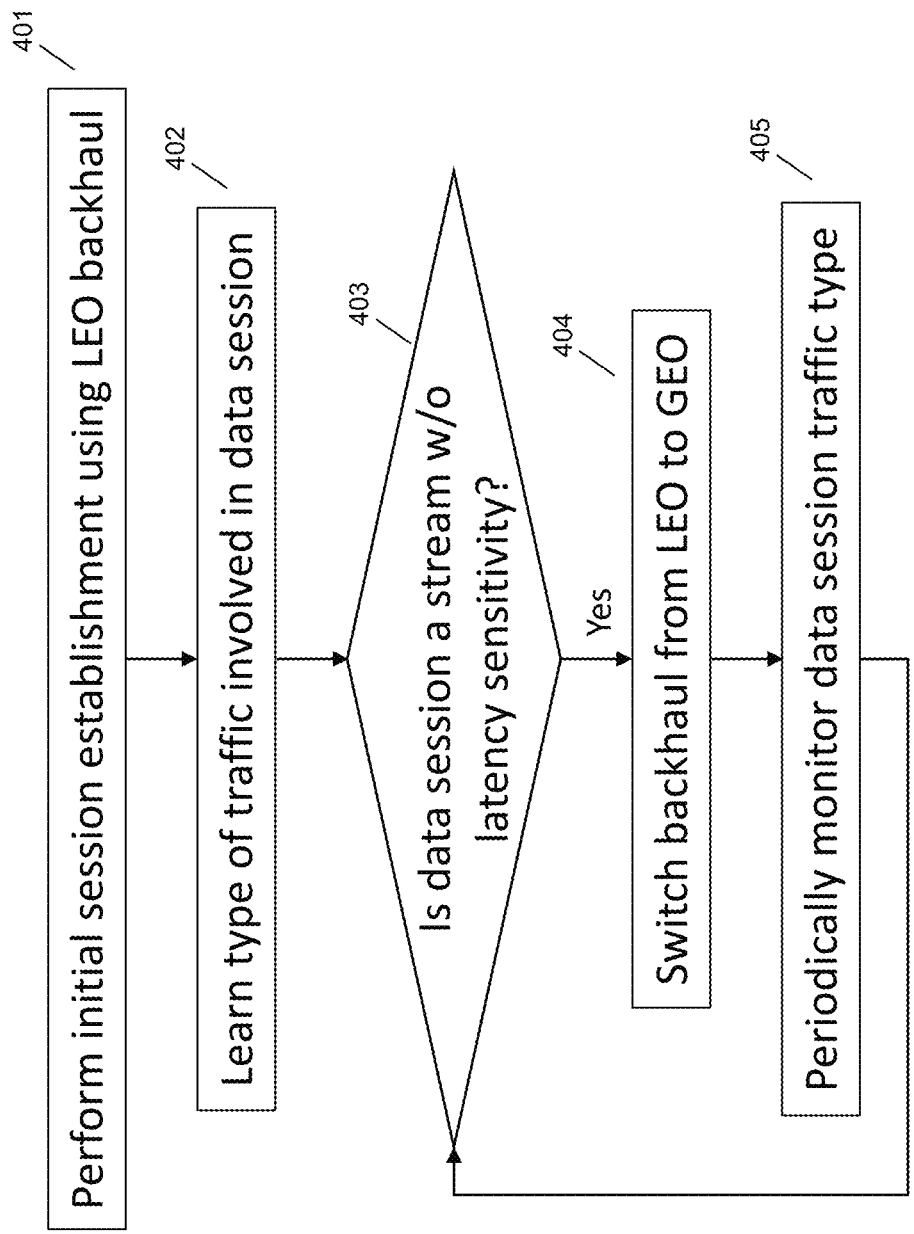
FIG. 4 depicts a flowchart of a determination to switch channels, in accordance with some embodiments.

FIG. 4 depicts a flowchart of a determination to switch channels, in accordance with some embodiments. At step 401, initial session establishment is performed using LEO backhaul. At step 402, the type of traffic involved in the data session is learned, in some embodiments at the coordinating node. At step 403, the determining node may determine whether a specific data session is a stream without latency sensitivity. If yes, the backhaul for the particular data session may be switched from LEO to GEO backhaul, in some embodiments. At step 405, the particular data session may be periodically monitored to ensure that the LEO/GEO backhaul is the correct one given current needs. In some embodiments, the channels may be backhaul channels or transport channels for a particular data stream.

Figure 5:
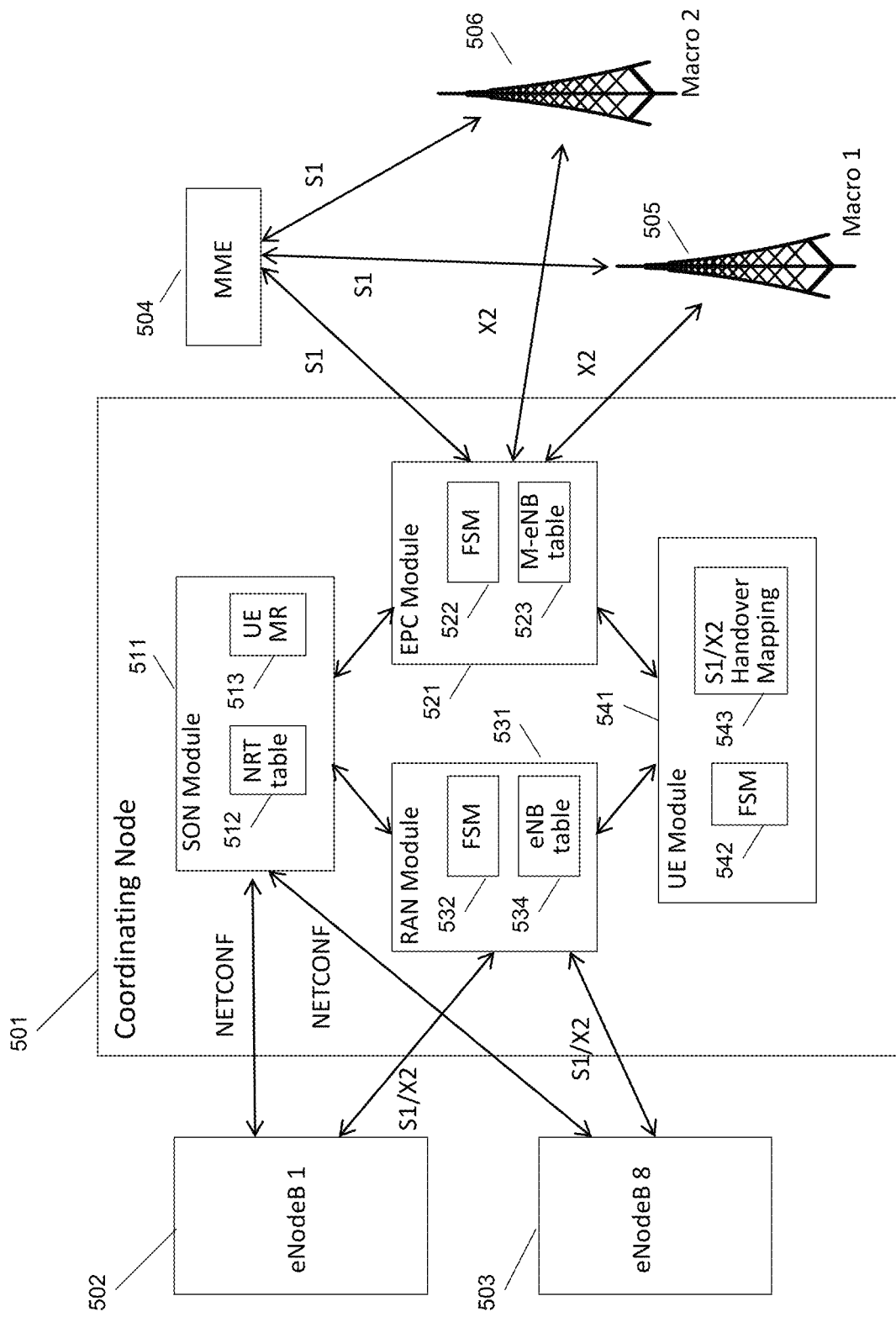
FIG. 5 depicts a coordinating node, in accordance with some embodiments.

FIG. 5 is a schematic diagram of a coordinating node, in accordance with some embodiments. Virtualization server 501 provides services to, and is coupled to, eNodeB 1 502 and eNodeB 5 503, on a RAN side of a network (i.e., inside of the gateway). Virtualization server 501 provides services to, and is coupled to, MME 504, macro eNodeB 505, and macro eNodeB 506, on a core network side of the network (outside of the gateway). Virtualization server 501 corresponds to LAC 110, in some embodiments.

Within virtualization server 501 are self-organizing network (SON) module 511, containing neighbor relation table (NRT) 512 and UE measurement report processing module 513; evolved packet core (EPC) module 521 (which could be a generalized core network module supporting one or multiple non-4G core networks), containing EPC finite state machine module 522 and macro eNodeB table 523; radio access network (RAN) module 531, containing eNodeB finite state machine module 532 and eNodeB table 534; and user equipment (UE) module 541, containing UE finite state machine module 542 and S1/X2 handover mapping table 543. UE module 541 may further contain a list of streams and/or bearers, and may perform decryption and deep packet inspection. In some embodiments, a mapping of streams to backhauls may be contained either in the UE module, the EPC module, or another module. In some embodiments, SON module 511 may perform NRT maintenance, load information processing and fractional frequency reuse (FFR) processing; RAN module 531 may perform X2 association management with eNodeBs 502, 503; EPC module 521 may perform X2 association management with macro eNodeBs 505, 506; and UE module may perform X2 handover and S1/X2 translation between eNodeBs 502, 503 and macro eNodeBs 505, 506. Finite state machine modules 522, 532, 542 may include one or more states for modeling the operational state of a connected EPC, UE, or RAN, respectively. More than one FSM may be present at each of modules 521, 531, 541, so that virtualization server 501 may be enabled to model the operational state of several network nodes at once. All the above managers/modules interact with each other to accomplish the assigned functionality. The functions described as being performed at one module herein may be performed at another module, or outside of a particular module, without loss of generality. Virtualization server 501 may include a network processing unit for performing packet forwarding and routing operations, and for performing deep packet inspection.

In some embodiments, virtualization server 501 may include one or more processors, each with one or more processor cores. Each of modules 511, 521, 531, and 541 are coupled to each other within virtualization server 501, and may execute on one or more shared processors (not shown) coupled with memory (not shown). Virtualization server 501 may include a real-time operating system, such as a Linux operating system, and may include an operating system that distributes tasks among multiple cores. Virtualization server 501 may provide one or more of modules 511, 521, 531, 541 as processes, threads, user-mode or kernel-mode processes, processes in hardware or in software, in some embodiments. In some embodiments, each of modules 511, 521, 531, 541 may execute on the same virtualization server 501; in other embodiments, these modules may execute on remote machines connected via a network. In some embodiments, a remote failover virtualization server (not shown) may be made available for handling failures at virtualization server 501. The failover mechanism may involve checkpointing operations at virtualization server 501 in each of the modules therein. Certain operations may be hardware accelerated, such as network processing tasks, IPsec tasks, deep packet inspection tasks, or other tasks.

Virtualization server 501 may include one or more network interfaces; these network interfaces may include Ethernet (10/100/1000/10000 Mbit) interfaces, Wi-Fi (802.11a/b/g/n/ac/af/ad) interfaces, 3G or 6G interfaces, virtual interfaces, or other interfaces. In some embodiments, one network interface may be directed towards the core network and located at, or coupled to, EPC module 521; this interface would communicate using the S1 protocol to MME 504 and using the X2 protocol to macro cells 505, 506. In some embodiments, another network interface may be directed towards one or more RANs internal to the gateway and connected to RAN module 531, for communicating to RANs 502, using either S1 or X2 as appropriate. Translation or interworking of protocols may occur at one or more of modules 511, 521, 531, or 541 as appropriate. In some embodiments, SON module 511 may also be coupled to an interface for communicating with RANs 502, 503; this interface may be labeled the SON interface, and the NETCONF protocol (XML over HTTPS) may be used to communicate in a proprietary or non-proprietary manner with RANs 502, 503 regarding network configuration, orchestration, and coordination operations.

Figure 6:
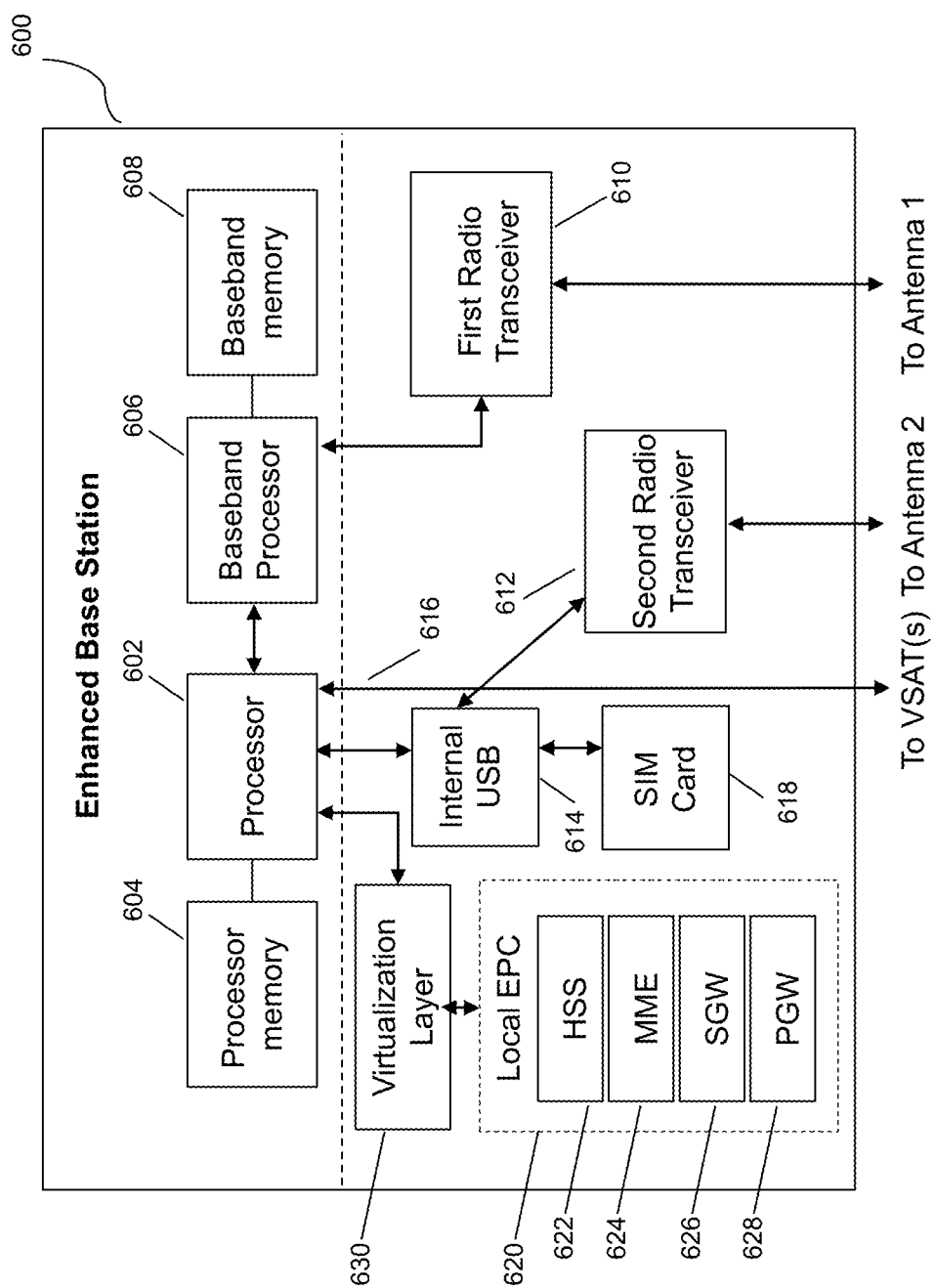
FIG. 6 depicts a base station, in accordance with some embodiments.

FIG. 6 is a schematic diagram of a base station, in accordance with some embodiments. Base station 600 may include processor 602, processor memory 604 in communication with the processor, baseband processor 606, and baseband processor memory 608 in communication with the baseband processor. Base station 600 may also include first radio transceiver 610 and second radio transceiver 612, internal universal serial bus (USB) 616, and subscriber information module card (SIM card) 618 coupled to USB bus 614. In some embodiments, the second radio transceiver 612 itself may be coupled to USB bus 614, and communications from the baseband processor may be passed through USB port 614 to the processor. The base station may be a mesh network base station. The processor 602 may be coupled directly to one or more VSAT satellite backhauls via connection 616, which may also be via the USB bus 614, in some embodiments.

A virtualization layer 630 may also be included for mediating communications with an evolved packet core EPC, specifically including the core network EPC (not shown) and local evolved packet core (EPC) module 620. Local EPC 620 may be used for authenticating users and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Virtualization layer 630 and local EPC 620 may each run on processor 602 or on another processor, or may be located within another device.

Processor 602 and baseband processor 606 are in communication with one another. Processor 602 may perform routing functions, and may determine if/when a switch in network configuration is needed. Baseband processor 606 may generate and receive radio signals for both radio transceivers 610 and 612, based on instructions from processor 602. In some embodiments, processors 602 and 606 may be on the same physical logic board. In other embodiments, they may be on separate logic boards. Baseband processing for second radio transceiver 612 and for the VSATs may be handled by the baseband processor 606, in some embodiments, or by external processors or embedded processors, in various embodiments.

The first radio transceiver 610 may be a radio transceiver capable of providing LTE eNodeB access network functionality to UEs, and may be capable of higher power and multi-channel OFDMA. The second radio transceiver 612 may be a radio transceiver capable of providing LTE UE functionality for wireless backhaul. Both transceivers 610 and 612 are capable of receiving and transmitting on one or more LTE bands. In some embodiments, either or both of transceivers 610 and 612 may be capable of providing both LTE eNodeB and LTE UE functionality. Transceiver 610 may be coupled to processor 602 via a Peripheral Component Interconnect-Express (PCI-E) bus, and/or via a daughtercard. As transceiver 612 is for providing LTE UE functionality, in effect emulating a user equipment, it may be connected via the same or different PCI-E bus, or by a USB bus, and may also be coupled to SIM card 618.

SIM card 618 may provide information required for authenticating the simulated UE to the evolved packet core (EPC). When no access to an operator EPC is available, local EPC 620 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

In addition to satellite backhaul, wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 610 and 612, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 602 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 610 and 612. Baseband processor 606 may use memory 608 to perform these tasks.

In some embodiments, data flows may be passed on a session-by-session basis. In some embodiments, various other units of data flow may be used, in addition to or in conjunction with sessions, for example, PDP contexts, GTP tunnels, IPsec tunnels, data bearers, 5G or non-5G network slices, IP flows sharing a specific IP address as destination/source, IP flows having a similar QCI, IP flows with a particular routing, IP flows with particular lengths of packets, etc. In some embodiments, data flows may be passed back and forth from GEO to LEO and vice versa as needed. In some embodiments, a mapping table may be used at the base station, in conjunction with the discrimination functiBaseband processing for second radio transceiver 612 and for the VSATs may be handled by the baseband processor 606, in some embodiments, or by external processors or embedded processors, in various embodiments, to determine which flows go to which backhaul.

In some embodiments, any gateway node can provide the LEO/GEO discrimination function. In some embodiments, decryption may be used to determine the type and nature of traffic passing through the network node for performing LEO/GEO discrimination. For example, where the encryption endpoints are the UE on one end and the HNG at the other end so all traffic does pass through the HNG. In some embodiments, the LEO/GEO discrimination function may be provided in conjunction with deep packet inspection (DPI), lawful intercept, local breakout, security gateway functionality, or other functions. In some embodiments, in network architectures with control and user plane separation (CUPS), any user plane node may provide LEO/GEO discrimination. In some embodiments, other routing changes may be performed, for example, in the case that the LEO network is connected with different peering networks, different DNS, distributed database, caching, etc. servers may be prioritized. In some embodiments, other transport layer changes may be adapted together with the LEO/GEO discrimination determination, for example, alteration of packet window size, buffer size, max packet size.

In some embodiments the base station or the UE may perform the LEO/GEO discrimination itself. In some embodiments the GEO satellite may only handle a small subset of the traffic that has been identified as not having strict latency requirements. In some embodiments, the LEO satellite may retain some or all of the data traffic. In some embodiments, the LEO satellite may be used only for signaling. In some embodiments, the coordinating nodes may be in orbit and/or at the LEO nodes. In some embodiments, the core network may perform the functionality described herein as being at the coordinating nodes. In some embodiments, the coordinating nodes may perform inter-radio access technology (inter-RAT) or multi-RAT coordination and may distinguish between different needs of different RATs at the base station or of different users on different RATs at the base station. In some embodiments, the base station or coordinating node may determine whether or not to use LEO/GEO or other backhaul, such as fixed wireless or fixed wired backhaul, and may discriminate on the same per-stream basis and use the same methods described herein for such discrimination.

In some embodiments, other factors may be taken into account by the discrimination function, such as: economic cost of LEO versus GEO; availability of LEO/GEO; orbital characteristics and visibility of LEO/GEO; height of the LEO/GEO receiver; cost of electrical power; cost of data bandwidth; cost of data fronthaul; latency characteristics of other links in the network as well as the LEO/GEO satellite link; latency characteristics of the user traffic; what specific users will be affected; prepaid/postpaid status of the user; quality of service parameters, including QCI, QOS, DHCP; time of day; estimated usage; historical estimates of usage; latency cost of handover between different LEO satellites; destination and/or source of traffic; packet sequence numbers; congestion; required throughput; L1/L2/L3 characteristics; and other factors.

The present disclosure could be used with any telecommunications system, including a cellular system (e.g., 2G/3G/4G/5G or other); a Wi-Fi or non-cellular wireless area network; a backhaul system for a non-wireless communications system; a system integrated into vehicles for providing wireless access to vehicles, including self-driving cars; etc. In particular, the inventors have appreciated that the latency-driven requirements of 5G may enable the use of LEO satellites to provide low-latency flows while moving higher-latency flows to GEO.

The inventors have contemplated the use of the present disclosure to provide narrowband Internet of Things (NBIOT) support as well. Support for narrowband (i.e., low bandwidth) devices, such as IoT devices, is understood in the art to be able to be provided by 2G data services, such as EDGE or GPRS, and as being able to be provided by 2G cells. Characteristics of NBIOT data streams can be used to discriminate between LEO and GEO channels for transport of the data, as described hereinabove. Characteristics of NBIOT data streams, including required throughput, congestion, etc. can be used to discriminate between 2G and other RAT (such as 4G or 5G) channels for transport of the data, using the general principles described hereinabove.

The inventors have more generally considered the use of one backhaul transport path or another, based on characteristics of the data stream. The inventors have also more generally considered the use of real-time network context of each session to determine a routing decision, and periodically reviewing the routing of the data flow, based on the various characteristics described herein. Other path discrimination alternatives in addition to the pair of LEO/GEO could be: IoT/other RAT; IoT/LEO; IoT/GEO.

The foregoing discussion discloses and describes merely exemplary embodiments of the present invention. In additional embodiments, the methods described herein can be stored on a computer readable medium such as a computer memory storage, a compact disk (CD), flash drive, optical drive, or the like. Further, the computer readable medium could be distributed across memory storage devices within multiple servers, multi-RAT nodes, controllers, computing cloud components, mobile nodes, and the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

The invention claimed is:

1. A method comprising:
    establishing a cellular data backhaul session using a first channel having a first characteristic different than a second characteristic of a second channel, wherein the first channel is a Low Earth Orbit (LEO) channel;
    determining a type of traffic involved in the data session;
    determining, based on the first characteristic of the first channel and the second characteristic of the second channel and the type of traffic involved, whether the second channel should be used for the data session;
    when the second channel should be used for the data session, then switching the data session from the first channel to the second channel; and
    periodically monitoring the data session to determine whether the second channel should continue to be used for the data session,
    wherein the data session comprises a first part and a second part, and using the first channel for the first part of the data session and using the second channel for the second part of the data session.

2. The method of claim 1, wherein the establishing a data session using a first channel comprises establishing a data session using an Internet of Things (IoT) channel or a cellular channel.

3. The method of claim 2, wherein the second channel comprises an IoT channel or a cellular channel or a Geosynchronous Equatorial Orbit (GEO) channel.

4. The method of claim 3, wherein using the first channel comprises using the LEO, and further comprising communicating with the LEO using a Very Small Aperture Terminal (VSAT).

5. The method of claim 1, wherein determining, based on the first characteristic of the first channel and the second characteristic of the second channel comprises determining wherein the first characteristic is latency of the first channel and the second characteristic is latency of the second channel.

6. The method of claim 1, wherein determining, based on the first characteristic of the first channel and the second characteristic of the second channel comprises determining wherein the first characteristic is cost associated with the first channel and the second characteristic is cost associated with the second channel.

7. The method of claim 1, wherein determining, based on the first characteristic of the first channel comprises determining wherein the first characteristic is an availability of the first channel.

8. The method of claim 1, wherein determining, based on the first characteristic of the first channel and the second characteristic of the second channel comprises determining wherein the first characteristic or the second characteristic is at least one Quality of Service (QOS) performance metric associated with the data session.

9. The method of claim 1, wherein using the first channel comprises using signaling data for the first part of the data session and wherein using the second channel comprises using data traffic for the second part of the data session.

10. A system comprising:
a terrestrial base station;
a first channel having a first characteristic, the first channel in communication with the terrestrial base station, wherein a data session is established using the first channel;
a second channel having a second characteristic, the second channel in communication with the terrestrial base station, wherein the second channel is a Geosynchronous Equatorial Orbit (GEO) channel and wherein the second characteristic is different from the first characteristic;
wherein a determination is made, based on the first characteristic of the first channel and the second characteristic of the second channel and the type of traffic involved in the data session, whether the second channel should be used for the data session; and when the second channel should be used for the data session, then the data session is switched from the first channel to the second channel and wherein the data session is periodically monitored to determine whether the second channel should continue to be used for the data session; and
wherein the data session comprises a first part and a second part, and using the first channel for the first part of the data session and using the second channel for the second part of the data session.

11. The system of claim 10, wherein the first channel is a Low Earth Orbit (LEO) channel.

12. The system of claim 11, wherein the second channel is an IoT channel or a cellular channel.

13. The system of claim 12, wherein using the first channel comprises using the LEO, and further comprising communicating with the LEO using a Very Small Aperture Terminal (VSAT).

14. The system of claim 10, wherein the first characteristic is latency of the first channel and the second characteristic is latency of the second channel.

15. The system of claim 10, wherein the first characteristic is cost associated with the first channel and the second characteristic is cost associated with the second channel.

16. The system of claim 10, wherein the first characteristic is an availability of the first channel.

17. The system of claim 10, wherein the first characteristic is at least one Quality of Service (QOS) performance metric associated with the data session.

18. The system of claim 10, wherein using the first channel comprises using signaling data for the first part of the data session and wherein using the second channel comprises using data traffic for the second part of the data session.

* * * * *